US007370055B1

(12) United States Patent
Pande

(10) Patent No.: US 7,370,055 B1
(45) Date of Patent: May 6, 2008

(54) EFFICIENTLY PERFORMING DELETION OF A RANGE OF KEYS IN A B+ TREE

(75) Inventor: Arvind Arun Pande, Pune (IN)

(73) Assignee: Symantec Operating Corporation, Cupertino, CA (US)

( * ) Notice: Subject to any disclaimer, the term of this patent is extended or adjusted under 35 U.S.C. 154(b) by 539 days.

(21) Appl. No.: 10/453,961

(22) Filed: Jun. 4, 2003

(51) Int. Cl.
*G06F 7/00* (2006.01)

(52) U.S. Cl. .................. 707/101; 700/100; 700/102

(58) Field of Classification Search ............... 707/100, 707/101, 102
See application file for complete search history.

(56) References Cited

U.S. PATENT DOCUMENTS

| | | | |
|---|---|---|---|
| 5,813,000 A | | 9/1998 | Furlani |
| 6,009,425 A | * | 12/1999 | Mohan ........................ 707/8 |
| 6,330,653 B1 | * | 12/2001 | Murray et al. .............. 711/173 |
| 6,427,147 B1 | * | 7/2002 | Marquis ...................... 707/4 |

OTHER PUBLICATIONS

Ramakrishnan, Raghu and Gehrke, Johannes, Database Management Systems, Aug. 2002, McGraw-Hill, 3rd ed., pp. 344-352.*
Paul E. Black, "Balanced Tree", in Dictionary of Algorithms and Data Structures [Online], Paul E. Black., U.S. National Institute of Standards and Technology. Jan. 24, 2005 <http://www.nist.gov/dads/HTML/balancedtree.html>, 1 page.*
Nicodeme, Pierre, "Compact Balanced Tries", 1992, Proceedings of the IFIP 12th World Computer Congress on Algorithms, Software, Archtecture- Information Processing 92, vol. 1.*
Elmasri et al., "Fundamentals of Database Systems", copyright 2000, Buschlen/Mowatt Fine Arts Ltd., Third Edition, pp. 175-183.*
Silberschatz et al., Database System Concepts, Third Edition, 1997, pp. 346-358.

* cited by examiner

*Primary Examiner*—Hung Q Pham
(74) *Attorney, Agent, or Firm*—Meyertons Hood Kivlin Kowert & Goetzel, P.C.; Jeffrey C. Hood

(57) ABSTRACT

A method for efficiently performing range deletions in a B+ tree. The method operates to delete all keys within a range in a plurality of iterations. Each iteration may comprise: 1) deleting all of the keys in one or more leaf-nodes that lie within the range of keys; and 2) adjusting entries in the node and its neighbors to perform any required rebalancing of the tree after the deletion. Each iteration of the deletion may comprise a Walk phase identifies nodes in the range of keys to be deleted; a Prepare phase which determines operations (delete and/or node adjust operations) to be performed at one or more levels in the B+ tree based on the identified nodes; and a Delete phase which performs the operations to delete keys in the range of keys in the B+ tree.

23 Claims, 4 Drawing Sheets

EFFICIENTLY PERFORMING DELETION OF A RANGE OF KEYS IN A B+ TREE

FIELD OF THE INVENTION

The present invention relates generally to computer system data structures, and more particularly to a method for performing bulk deletions of keys from a balanced multiway tree, such as a B+ tree.

DESCRIPTION OF THE RELATED ART

The following is a glossary of terms used in the present application:

Node—A data structure comprising data.

Tree—A composite data structure comprising linked nodes, with access beginning at one node designated as the root node. Each node is either a leaf or an internal node. An internal node has one or more child nodes and is called the parent of its child nodes. All children of the same node are siblings.

Search tree—A tree where every subtree of a node has values less than any other subtree of the node to its right. The values in a node are conceptually between subtrees and are greater than any values in subtrees to its left and less than any values in subtrees to its right.

Balanced tree—A tree where no leaf is much farther away from the root than any other leaf.

Multiway tree—a tree with any number of children for each node.

B-Tree—A balanced search tree in which every node has between (m/2) and m children, where m is a fixed integer >1. The root must contain at least 2 children.

B+ tree—a balanced, multi-way tree with the following properties:
1) Each node, except the root-node, must contain at least N/2 entries, where N is the maximum number of entries that can be stored in a single node;
2) The root-node must contain at least 2 entries;
3) The data for a key is stored only in the leaf-nodes and all other nodes (the internal-nodes) store only referential data (pointers to other nodes) that is used to traverse the tree down to the leaf-nodes.

Various types of data structures are used to efficiently store and retrieve data from storage systems. In general, certain types of data structures are preferred for certain types of memory storage. For example, a B-tree (or one of it's variants like a B+ tree) would be preferred when the data to be stored and retrieved can be ordered and indexed since it provides excellent access times and also makes the index amenable to be stored persistently on hard-disk. B-trees are efficient because they use nodes with many branches (multiway) and store data in the nodes in an ordered format. Thus, searching within a node can be done efficiently. Further, the access/search time for keys in a B-tree are predictable because the tree is balanced and hence every leaf node is equidistant from the root-node. A record can be found by passing through fewer nodes when there are many children per node, as opposed to when there are two children per node.

A B-tree may generally be described as a data structure that maintains an ordered set of data and allows efficient operations to find, delete, insert, and browse the data. Generally, each piece of data stored in a B-tree may be referred to as a "key". A B-tree comprises "node" records containing the keys and pointers that link the nodes of the B-tree together. Every B-tree is of some "order n", meaning nodes contain from n to 2n keys, and nodes are thereby always at least half full of keys. Keys are kept in ascending sorted order within each node. A corresponding list of pointers are effectively interspersed between keys to indicate where to search for a key if the respective key is not in the current node. An internal node containing k keys also contains k+1 pointers. A B+ tree may be considered a B tree variant where the data for a key is stored only in the leaf-nodes and all other nodes (the internal-nodes) store only referential data (pointers to other nodes) that is used to traverse the tree down to the leaf-nodes.

Entries in a B+ tree node are also referred to as keys. A search-key is the key used in a B+ tree walk to descend down to the leaf-node that contains the search-key and its data (or to the leaf-node where this key would be inserted if the search-key does not currently exist in the tree). At each internal-node, the search-key is used in a binary search to find the next node to follow. At each level, the node where the search is performed is called the search-node.

A neighbor is a node that lies immediately to the left (left-node) or right (right-node) of the search node. Except for the root-node, every search-node must have at least one neighbor.

Published algorithms exist which perform single key deletions from a B+ tree. In the case of range deletions (deletion of a range of keys), a single key deletion algorithm is required to be invoked once for every key to be deleted in that range. This approach has two major disadvantages:

1. In a concurrently accessed tree, this approach would require exclusive locks to be taken on the tree (or at least the relevant nodes, depending on the deletion algorithm) once for every key deletion. Since most uses of a B+ tree index require the tree to transition from one consistent state to another, this would also mean that as many transactions would have to performed. For a large B+ tree where each range deletion consists of a large number of entries to be deleted at one time, this can become very expensive and detrimental to concurrent access of the tree.

2. All the keys that need to be deleted need to be known prior to starting the deletion. This means that if a large number of keys have to be deleted within a range, each key to be deleted in that range needs to be known. This may not always be possible, unless the application/client that invokes the deletion keeps track of all the keys that have been inserted into the tree.

As discussed above, algorithms to perform single key insertions and deletions in B+ trees are well known, but there is currently no known methodology for performing bulk deletions of keys from a B+ tree. Published algorithms to perform single key deletions from a B+ tree are highly inefficient for applications that require deletion of a whole range of keys from a concurrently accessed B+ tree. Therefore, an improved method is desired for performing bulk deletions of keys from a B+ tree. More generally, improved method is desired for performing bulk deletions of keys from a tree data structure, such as a balanced multiway tree, a B-tree or B+-tree.

SUMMARY OF THE INVENTION

One embodiment of the invention comprises a method for efficiently performing range deletions in a B+ tree. The method operates to delete all keys within a range specified by a starting key and an ending key. The method is preferably implemented as a software program executable on a computer system.

The method described herein is useful for applications of B+ trees that contain a large number of entries, where each deletion would require a significant fraction of those entries within a specified range to be deleted. For example, consider a B+ tree where each key belongs to a cluster of keys and the keys are ordered such that keys of one cluster lie within a range in the B+ tree. In this case, deletion of a cluster will require every key within that cluster (range) to be deleted. Embodiments of the invention are particularly useful in deleting such a cluster or range of keys.

In one embodiment, the method may comprise receiving information regarding a range of keys to be deleted in a B+ tree. The information regarding the range of keys to be deleted preferably comprises a starting key and an ending key, and the range of keys may span multiple nodes. In one embodiment, range information may be input by the user. In an alternate embodiment, the range information may be generated programmatically, i.e., may be generated by another software program or application.

The method may then operate to delete the range of keys from the B+ tree. The method preferably performs the deletion of the range of keys in a plurality of iterations. The plurality of iterations may be substantially less than the total number of keys in the range of keys. In one embodiment, for each of at least a subset of the plurality of iterations, the iteration comprises: 1) deleting all of the keys in one or more leaf-nodes that lie within the range of keys; and 2) adjusting nodes (by deleting, shifting and/or rotating entries from nodes and their neighboring nodes) at more than one level, to rebalance the tree after the deletion.

More specifically, in one embodiment each iteration of the deletion may comprise the following three steps or phases.

The first phase (the Walk phase) of the iteration comprises walking (or traversing) a portion of the B+ tree to be deleted to identify nodes in the range of keys to be deleted. The Walk phase comprises walking the portion of the B+ tree starting from the root node, and using the starting key as a search key. The walking may also comprise, at each level, locking the search node, a left node of the search node, if present, and a right node of the search node, if present. Information regarding the nodes identified in the walking phase may be stored in a data structure (the delete data structure).

The second phase of the iteration may comprise determining operations to be performed at one or more levels in the B+ tree based on the identified nodes. This step of determining operations may comprise walking or traversing the delete data structure (examining the information in the delete data structure), preferably starting from a leaf node, to determine the required operations to delete these nodes. The step of determining operations may comprise determining at least one operation to be performed on each level that is affected by the deletion. The determined operations may comprise one or more delete operations and/or one or more node adjustment operations. The determined operations are preferably stored in the delete data structure, preferably proximate to, or linked to, the nodes or keys affected by the operation. In one embodiment, the operations may comprise: a simple delete; a node delete; a shift and delete; an adjust parent-node after a shift and delete at the lower level; a merge and delete; an adjust parent-node after a merge and delete at the lower level; and a root collapse.

The third phase of the iteration may comprise performing the determined operations to delete one or more keys in the range of keys. Performing the operations may comprise traversing or walking the delete data structure, preferably starting from a leaf node, to perform the operations stored in the delete data structure. Performance of each operation may comprise deleting one or more keys in the range of keys and adjusting any affected nodes accordingly.

The above steps of walking a portion of the B+ tree, determining operations, and performing the operations may be iteratively performed a plurality of times to delete the range of keys.

BRIEF DESCRIPTION OF THE DRAWINGS

A better understanding of the present invention can be obtained when the following detailed description of the preferred embodiment is considered in conjunction with the following drawings, in which.

Figure 1:
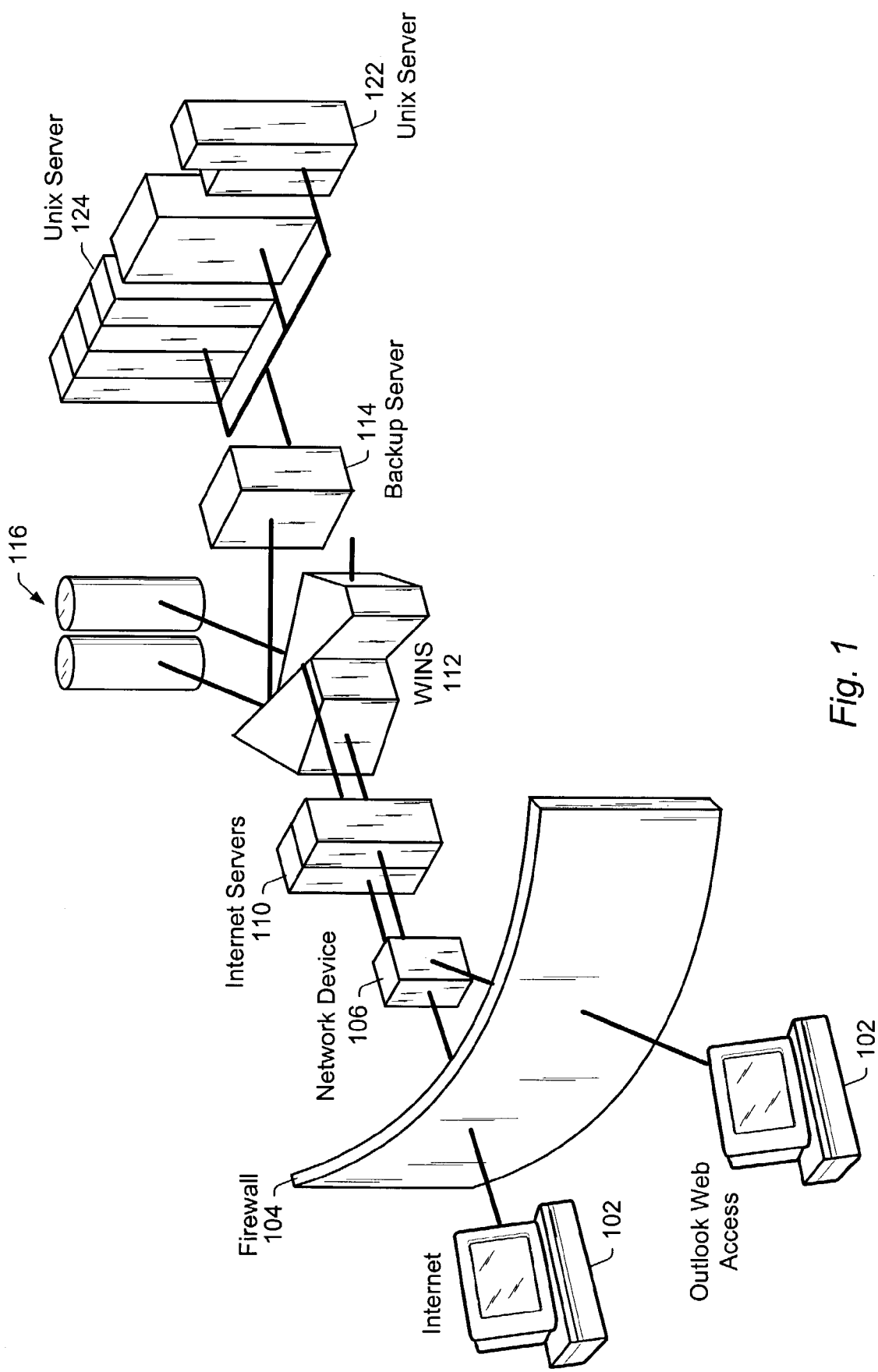
FIG. 1 illustrates one embodiment of a system which may utilize embodiments of the invention.

While the invention is susceptible to various modifications and alternative forms specific embodiments are shown by way of example in the drawings and are herein described in detail. It should be understood however, that drawings and detailed description thereto are not intended to limit the invention to the particular form disclosed, but on the contrary the invention is to cover all modifications, equivalents and alternative following within the spirit and scope of the present invention as defined by the appended claims.

DETAILED DESCRIPTION OF THE PREFERRED EMBODIMENT

FIG. 1—Exemplary Network System

FIG. 1 illustrates an exemplary system which may utilize an embodiment of the invention. Embodiments of the invention may be used in any of various types of computer systems, network systems (systems comprising two or more computers or storage devices coupled by a network), or enterprise systems, and FIG. 1 illustrates one example of a network system. Thus a system which utilizes an embodiment of the invention may be a single computer system, a local area network (LAN), two or more interconnected local area networks, or a wide area network (WAN) comprising two or more distributed LANs coupled together, such as by the Internet, among other possible configurations.

As shown in the exemplary system of FIG. 1, the network system may include one or more client computer systems 102. The client computer systems 102 may store and/or execute various applications, such as programs for Internet access, database programs, and/or an electronic mail (email) or electronic contact/scheduling program, and others. The one or more client computer systems 102 may be connected through a firewall 104 to a network device 106, such as a router, hub, or bridge. The client computer systems 102 may couple through the firewall 104 and/or network device 106 to one or more Internet servers 110. The Internet servers 110 may be connected to various other computer systems and/or storage devices, such as a WINS server 112, a backup server 114, and/or a storage area network (SAN) 116. These servers may in turn be connected to other servers which host other applications, such as Unix servers 122 and 124. For example, Unix server 124 may run VERITAS Volume Manager using a space optimized snapsnot feature.

One or more of the computer systems or storage systems shown in FIG. 1 may store data in the form of tree data structure, such as a B+-tree data structure. For example, one or more of the server computer systems 110, 112, 114, 122, 124 or the SAN 116, may comprise a memory medium or data storage system (e.g., a database, etc.) which stores data at least partially in the form of a B+-tree data structure.

In one embodiment, at least one of the computer systems (e.g., server 124) performs indexing and re-vectoring of portions or "chunks" of data that are stored on hard-disk using B+ trees. In one embodiment, each node of the B+ tree corresponds to a system page size of 4K and can hold 200+ entries. In other embodiments, one or more B+ tree data structures may be used to store other types of data with different node size and number of entries per node.

For example, in one particular embodiment, at least one of the computer systems (e.g., server 124) performs space-optimized (SO) snapshots (preferably VERITAS Volume Manger space optimized snapshots) to store data. The SO snapshots are preferably implemented using a virtualization object (preferably the VERITAS Volume Manger cache object) operating as a space-optimized persistent store. The virtualization object uses translation maps that are preferably stored in one or more B+ tree data structures. Therefore, in a current embodiment, Unix server 124 preferably runs VERITAS Volume Manager using a space optimized snapsnot feature and utilizes one or more B+ tree data structures.

One embodiment of the present invention comprises a software program executable on a computer system which operates to perform range deletions or bulk deletions from a B+-tree. In various embodiments, the software programs described herein may be stored in various locations, such as on a memory medium of one of the client computer systems 102, or a memory medium of one of the server computers. The software program described herein may execute on any of various computer systems.

The term "memory medium" is intended to include any of various types of memory devices for storing programs and/or data. For example, the term "memory medium" is intended to include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution.

A memory medium may be comprised in a storage system for storing data according to a data structure. As used herein, the term "storage system" includes any of various types of systems which provide storage capabilities, including, but not limited to, a server computer (e.g., having one or more RAID arrays), two or more coupled server computers, a storage area network (SAN), and other types of storage or memory systems.

The software programs which implement embodiments of the present invention may be stored in a memory medium of one of the computers shown in FIG. 1, or in a memory medium of another computer, and executed by one or more processors or CPUs. One or more CPUs executing code and data from a memory medium thus may comprise a means for performing the methods described herein. For example, a CPU executing code and data from a memory medium may comprise a means for deleting a range of keys from a B+-tree according to the methods described herein.

Various embodiments may further include receiving, sending or storing instructions and/or data that implement embodiments of the invention in accordance with the foregoing description upon a carrier medium. Generally speaking, a carrier medium may include a memory medium as defined above, as well as transmission media or signals such as electrical, electromagnetic, or digital signals, conveyed via a communication medium such as network and/or a wireless link.

In general, the term computer system as used herein is defined to encompass any device having a processor which executes instructions from a memory medium. In different embodiments, a "computer system" may take various forms, including a personal computer system, desktop computer, mainframe computer system, server computer system, personal digital assistant (PDA), another suitable device, or combinations thereof. A computer system may be coupled to a network as part of a distributed computing environment.

Delete Data Structure

The delete method described below in the flowchart of FIG. 2 preferably uses a data structure (referred to as the "delete data structure") to keep track of the variables and actions that are performed in each pass at each level of the tree. In one embodiment, the delete data structure may comprise the following fields:

Pointer To Left Node
Pointer To Search Node
Pointer To Right Node
Starting Key Index (Index Of The First Key To Be Deleted)
Ending Key Index (Index Of the Last Key To Be Deleted)
Count Of Entries To Be Deleted
Flags (Description Of The Actions That Need To Be Performed At Each Level)

In the preferred embodiment, the delete data structure for the delete process is an array of the above structure (having the above fields), and the size of the array is equal to the depth of the B+ tree. All relevant information at each level is stored in the delete data structure in the form of flags or entries in the structure so that it can be accessed in any phase at any level. The top-most entry in the delete data structure corresponds to the root-node of the B+ tree and the bottom-most entry corresponds to the leaf-node. The delete data structure can also carry any other information (e.g., per-node locks, per-node resources, etc.) that may be specific to the implementation.

Figure 2:
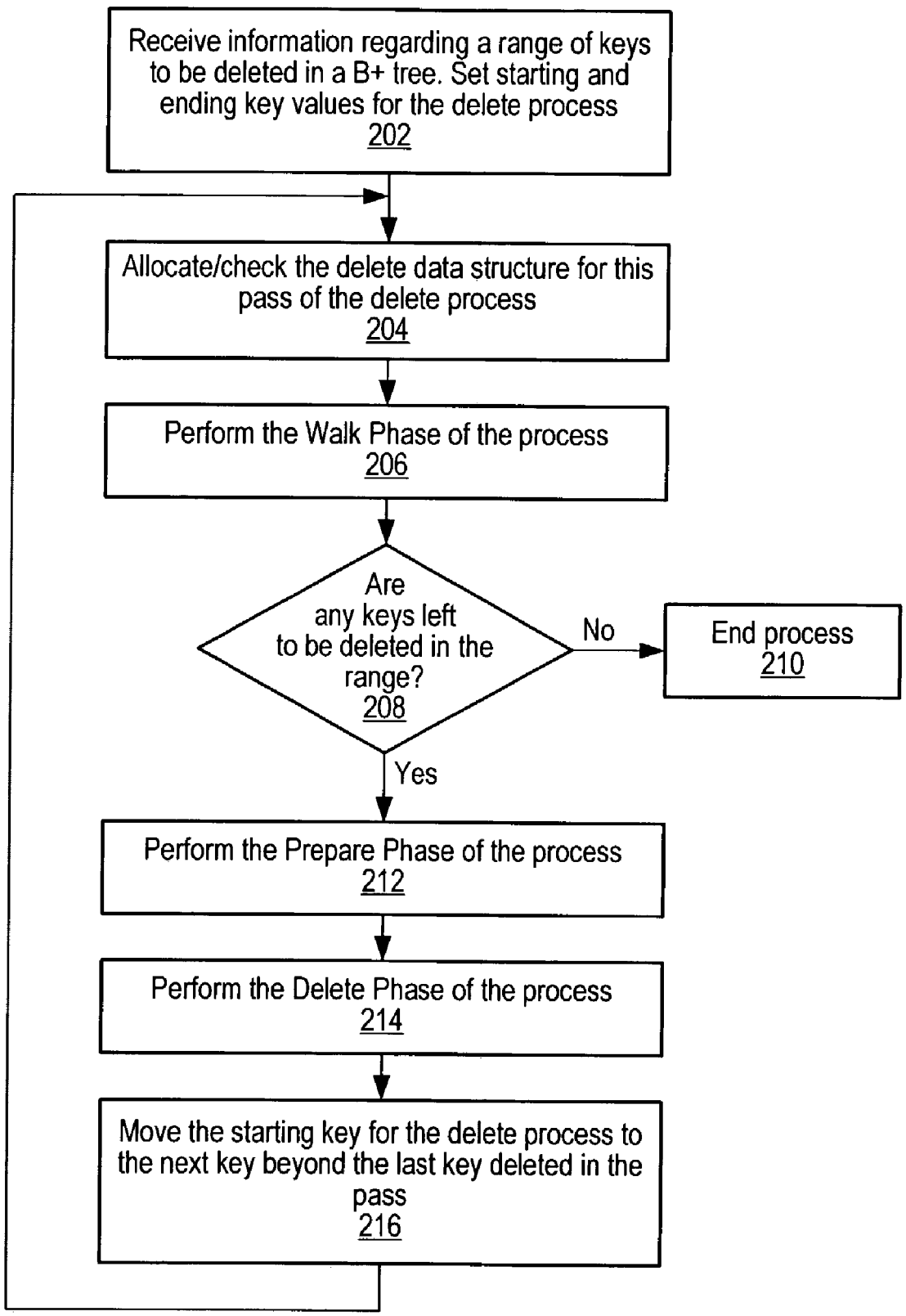
FIG. 2 is a flowchart diagram of one embodiment of the delete method of the invention.

FIG. 2—Flowchart Diagram

FIG. 2 is a flowchart diagram illustrating one embodiment of the deletion method or algorithm (or process). The deletion method performs the deletion of an entire range of keys in a B+ tree, specified by a starting key (skey) and an ending key (ekey). The deletion method performs the range deletion over a number of iterations that is substantially less than the total number of keys to be deleted. In one embodiment, the number of iterations is substantially less than the total number of keys to be deleted when the number of iterations is less than 5% of the total number of keys to be deleted. The gain in efficiency may depend on the maximum number of entries allowed in each node and the average occupancy of the B+ tree. As one example, assuming that there are 200 entries in each node and the tree has an average occupancy of say 60%, the method can delete about 120 keys per iteration. Hence if it is desired to delete 360 keys, the method can perform this deletion in 3 to 4 iterations, as compared to 360 iterations that would be required if one key were deleted at a time.

As noted above, the deletion method is preferably performed by a software program. Here it is presumed that the B+ tree is known/accessible/controlled by the program, i.e., the program has access to all the nodes of the B+ tree and has the required control to make modifications to the B+ tree.

Each iteration of the delete operation preferably comprises three phases that are each described in detail below.

Although the preferred embodiment of the method is described below with respect to B+ trees, it is noted that embodiments of the invention may be readily adapted to other types of tree data structures, such as B-trees, other types of balanced multiway trees, Search trees, etc.

As shown in FIG. 2, at 202 the method preferably first receives information regarding a range of keys to be deleted in a B+ tree. For example, at 202 the user may provide input specifying the starting and ending key values for the delete process. This user input may be received from the user in various ways, such as from a graphical user interface (GUI), a command line, etc. The input specifying the starting and ending key values for the delete process may also be generated programmatically, e.g., by another application. The information regarding the range of keys to be deleted preferably comprises a starting key and an ending key, and the range of keys may span multiple nodes. In other words, the range to be deleted is specified by a starting key (skey) and an ending key (ekey). In the preferred embodiment, all keys in the B+ tree that lie within this range (including the skey and ekey) will be deleted along with their data. In one embodiment, the starting and ending keys in the range (the skey and ekey) themselves need not exist as entries in the B+ tree. All keys within the range between the starting and ending keys will be deleted.

At 204 the method allocates/checks the delete data structure for the current pass of the delete process. In the first iteration of step 204, the method allocates the delete data structure for use in the delete process. During subsequent iterations of step 204, the method checks the delete data structure to ensure that the delete data structure is valid for the next iteration. This is because, depending on the implementation and how the B+ tree is being used while the delete is in progress, the depth of the tree can change between iterations. Hence, the method checks the size of the delete structure that was allocated and ensures that it is valid for the next iteration.

At 206 the method performs the first phase (the Walk Phase) of the delete process. The first phase performs a walk or traversal on the B+ tree starting from the root-node. In this walk, the skey for the iteration is used as a search-key to walk down the tree. At each level, the search-node, the left-node (if it exists) and right-node (if it exists) are locked exclusively and the information regarding the nodes is setup in the delete data structure. In one embodiment, the Walk Phase operates to only incorporate information into the delete data structure regarding the nodes discovered in the walking of the B+ tree.

The following is a pseudo-code representation of the Walk Phase according to one embodiment:

1. If the node has a left neighbor, lock the left neighbor.
2. Lock the node.
3. If the node has a right neighbor, lock the right neighbor.
4. Binary search the starting key index in the node.
5. If this is a leaf node, binary search the ending key index in the node. If the ending key is not found in the leaf node, the index of the largest key (last key) in the leaf node is recorded as the ending key index. Goto step 208.

All keys in the range between the starting key index and the ending key index in the node will be deleted (in the Delete Phase) in this pass.

6. If this is not a leaf node, mark whether the next node (child in the search path) has left and right neighbors and continue to (1) above.

The one key marked by the starting key index in the node will be the key to be deleted in this pass.

7. Store the information gathered in the steps above (like left neighbor, right neighbor, starting key index etc) in the delete data structure so that it can be used by the subsequent phases as required.

At 208, if there are no more keys left to be deleted in the range, then the delete process ends in step 210. If there are more keys to be deleted in the range, then operations continue to the next phase at 212.

As shown in FIG. 1, at 208 the method determines if there are any keys left to be deleted in the range. If not, then the process ends at 210. If there are keys left to be deleted in the range, then operation proceeds to 212.

At 212 the method performs the second phase (the Prepare Phase) of the delete process. The Prepare Phase breaks the delete process down into a set of operations (described below), one operation to be performed on each level that is affected by the deletion. Each operation may comprise one or more of a delete operation and a node adjust operation.

The following comprise operations used in the delete process according to one embodiment:

Simple delete—This operation involves just deleting the specified entries from the node without requiring re-balancing of the tree. For an internal-node, a Simple delete may be performed when the internal-node contains more than N/2 entries. For a leaf-node a Simple delete may be performed when the total number of entries being deleted in the iteration does not decrease the total key count for the leaf-node below N/2. This is a terminating operation and no more operations need to be performed on any levels above.

Node delete—This operation can be performed only on a leaf-node and happens when every entry in the leaf-node falls within the delete range. The whole leaf-node is deleted and the upper levels will be re-balanced as required.

Shift and delete—This operation involves shifting over some entries from a neighboring node (left-node or right-node) such that each of the nodes is re-balanced with at least N/2 entries in each. A Shift and delete operation may be performed when the total number of entries between the neighboring node and the search-node is greater than or equal to N. If the search-node has both neighbors, the left-node is chosen for the shift operation. This is done so that all the entries that are shifted into the search-node are out of the range of deletion and the deletion moves into the right-node for the next iteration. This is done to maximize the number of entries that get deleted in the next iteration.

Adjust parent-node after a shift and delete at the lower level—This operation is performed when a shift and delete has been performed at the lower level and requires adjustments (rotations) in the keys pointing to the nodes below since the entries in the lower level have been redistributed. This is a terminating operation and no more operations need to be performed on any levels above.

Merge and delete—This operation involves combining all the remaining entries (after deletion) from the search-node with the neighboring node (left-node or right-node) such that the merged node contains less than N entries and the search-node is deleted. This is done when the total number of entries between the neighboring node and the search-node is less than N. If the search-node has both neighbors, the left-node is chosen for the merge operation.

Adjust parent-node after a merge and delete at the lower level—This operation is performed when a merge and delete has been performed at the lower level and requires adjustments (rotations) in the keys pointing to the nodes below since the entries in the lower level have been redistributed. This is a terminating operation and no more operations need to be performed on any levels above.

Root collapse—This operation may be performed when the current root-node contains only 2 keys and a key has to be deleted from it. The Root collapse operation involves making one of the children of the root-node the new root-node. This is a terminating operation since there are no more levels above.

The second phase (Prepare phase) in 212 walks the delete data structure setup in the Walk phase of step 206, starting from the leaf node, in reverse order, and identifies the operation to be performed at each level. The operations are preferably marked or indicated in the delete data structure. The Prepare phase in 212 terminates when it encounters a terminating operation like Simple Delete, Adjust After Shift, Adjust After Merge, or Root Collapse that does not require any operations on the parent node. All nodes in the delete data structure above this terminating level will not be involved in this delete iteration and all locks and resources corresponding to those can be released.

The following is a pseudo-code representation of the Prepare Phase according to one embodiment:

1. Set delete data structure index to the bottom of the delete data structure (corresponding to the leaf node).
2. If all entries in the leaf-node are within the range, mark action as "Node Delete".
3. If the deletion of the required number of keys from the node reduces the number of keys in the node below N/2, and the previous action was not a "Shift and Delete", a shift or a merge with a neighboring node is required. Mark the action as "Shift and Delete" if the neighbouring node has more than N/2 keys. Else, mark the action as "Merge and Delete".

Preference should be given to shift or merge with the left neighbor since that will result in better performance of this delete algorithm.

4. If the previous action was a "Delete Node" or a "Merge and Delete" and this is a root-node, mark the action as a "Root Collapse". Go to (7).
5. If the previous action was a "Shift and Delete", mark action as "Adjust Parent after Shift and Delete". If the previous action was a "Merge and Delete", mark action as "Adjust Parent after Merge and Delete". Else, mark action as a "Simple Delete". Go to (7).
6. Move delete data structure index upwards and return to (2).
7. All nodes that are not part of the delete process (do not have an action marked against them in the iteration above) can be unlocked, before continuing to the next phase. This ensures that only a sub-tree of the whole tree needs to remain locked during the remaining part of the delete operation and the remaining B+ tree becomes available for concurrent access.

At 214 the method performs the third phase (the Delete phase) of the delete process. The third phase performs the actual delete operation. More specifically, the third phase performs the operations in the delete data structure, where these operations may comprise delete operations and/or adjust operations. The adjust operations may comprise adjusting nodes (e.g., by deleting, shifting and/or rotating entries from one or more nodes and neighboring nodes of the one or more nodes) at one or more levels, and preferably more than one level, to rebalance the tree after the deletion. This is basically done to "rebalance" the tree after the deletion.

The third phase walks the delete data structure starting from the leaf node, in reverse order, and performs the operation indicated in the delete data structure (identified by the second phase). The Delete phase terminates after performing a terminating operation (like a Simple Delete, Adjust After Shift, Adjust After Merge or Root Collapse) that does not require any further operation in the nodes above.

The following is a pseudo-code representation of the Delete Phase according to one embodiment:

1. Set delete data structure index to the bottom of the delete data structure (corresponding to the leaf node).
2. If the action is "Simple Delete", delete the keys in the range from the starting key index to the ending key index. In case of leaf-nodes this can be a range of keys to be deleted. In the case of non-leaf-nodes only one key (the one indicated by the starting key index) will be deleted. The delete phase ends here. Goto (9).
3. If the action is "Node Delete", the node will generally be a leaf-node. The whole node is to be deleted since all the keys in this leaf-node fall within the range. The rebalancing of the tree will be performed in the upper nodes, so then return to (2) and continue.
4. If the action is "Shift and Delete", delete the keys in the range (for non-leaf-nodes only one key will be deleted). Since the total number of keys in the node is now below N/2, balance the keys with the appropriate neighbor by shifting some of the keys into this node. The rebalancing of the tree will be performed in the upper nodes so go back to (2) and continue.
5. If the action is "Adjust Parent Node after Shift and Delete at the Lower Level", perform the required rotations in parent node. The Delete phase ends here. Goto (9).
6. If the action is "Merge and Delete", delete the keys in the range (for non-leaf-nodes only one key will be deleted). Since the total number of keys in the node is now below N/2, balance the keys with the appropriate neighbor by merging the keys of that node into this node. The rebalancing of the tree will be performed in the upper nodes so go back to (2) and continue.
7. If the action is "Adjust Parent after Merge and Delete at the Lower Level", perform the required deletion of the key (for the node that was deleted below) and rotations in the parent node. The Delete phase ends here. Goto (9).
8. If the action is "Root Collapse" delete the root-node. One of the children of the root node will become the new root-node. The Delete phase ends here. Goto (9).
9. Release locks on the nodes. Cleanup.

After the Delete Phase in 214, at 216 the method moves the starting key for the delete process to the next key beyond the last key deleted in the pass. Operation then returns to 204, and the above operations are repeated. Thus 216 effectively performs a "restart to delete the next batch", i.e., begins a new iteration. Each iteration deletes all the keys that lie in the leaf-node between the skey (starting key for that iteration) and the ekey (ending key for that iteration). If the last entry in the leaf-node is less than ekey, then the number of keys deleted in that iteration will be all the keys between and including skey and the last key in the leaf-node. The skey is incremented to the next key beyond the last key deleted in the current iteration before starting the next iteration. The delete process terminates when there are no more keys in the specified range and this is detected by the first phase.

For a tree that can contain a maximum of N keys per node, each iteration can delete a maximum of N keys and a minimum of 1 key. Each iteration will on the average delete approximately as many keys as the average occupancy of the nodes of the B+ tree.

In one iteration of the method (comprising the Walk Phase, Prepare Phase, and Delete Phase in steps 204-216) only one entry is deleted from the internal nodes, and this entry is given by the index of the search-node for the next level. The search terminates at the leaf-node.

The deletion of a range of keys is done at the leaf-node level. The starting entry for the deletion in this iteration is given by the first entry in the leaf-node that is greater than or equal to the skey for the iteration. The ending entry for the deletion in this iteration is given by the last entry in the leaf-node that is less than the ekey for the iteration. The total number of entries that are to be deleted in this iteration is given by the number of entries that lie between and including the ending entry and the starting entry. If there are no entries remaining in the range, the delete process is completed.

FIGS. 3-7: Example Operation of the Delete Process

FIGS. 3-7 illustrate an example of the delete process.

Figure 3:
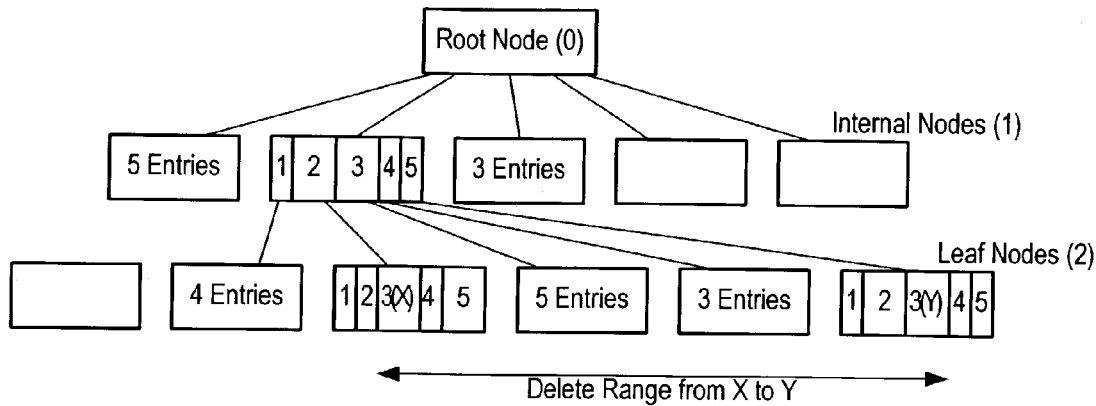
FIGS. 3-7 illustrate exemplary operation of the delete method according to one embodiment of the invention.

Consider the exemplary B+ tree in FIG. 3. The tree shown in FIG. 3 can have at most 5 entries per node and has a depth of 3. The delete range is from X to Y which corresponds to a total of 14 entries to be deleted. Using the above described procedure, the delete operation can be achieved in just 4 iterations (as compared to 14 iterations using the single key deletion algorithm). The states the tree will go through and the operations performed at each level in the iteration are given below.

FIG. 3 illustrates the initial state of the tree. Here it is presumed that input is received (either from the user or from a program) specifying the delete range from X to Y.

Figure 4:
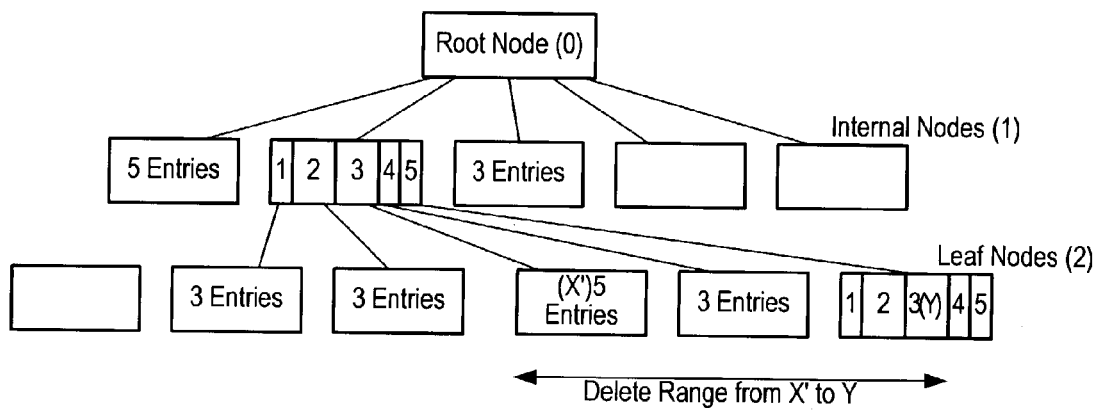

During Iteration 1, a shift and delete (with the left-node) will be performed on level-2 and a shift adjust will be performed on level-1. The resultant tree will be as shown in FIG. 4. The starting key for the next iteration will be shifted to X' which is the first entry of the right-node.

Figure 5:
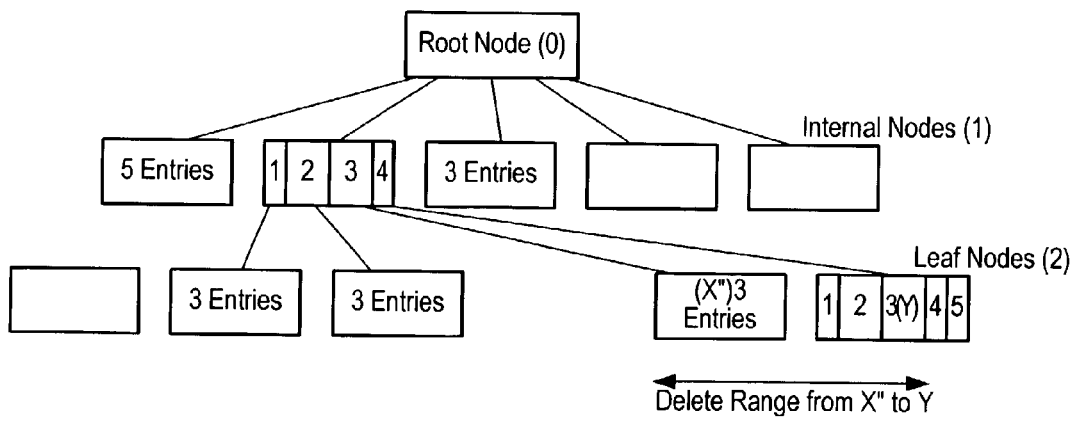

During Iteration 2, A delete node will be performed on level-2 and a simple delete will be performed on level-1. The resultant tree will be as shown in FIG. 5. The starting key for the next iteration will be shifted to X" which is the first entry of the right-node.

Figure 6:
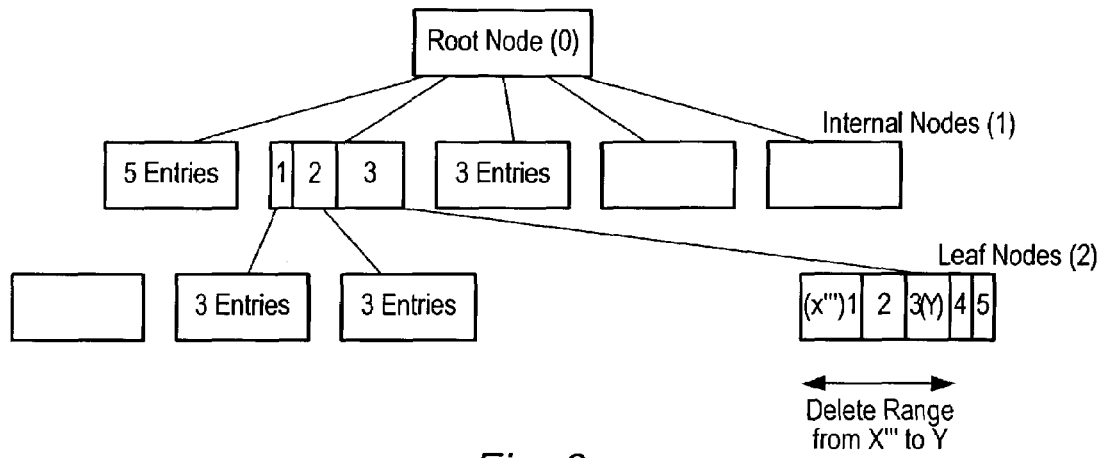

During Iteration 3, a delete node will be performed on level-2 and a simple delete will be performed on level-1. The resultant tree will be as shown in FIG. 6. The starting key for the next iteration will be shifted to X'" which is the first entry of the right-node.

Figure 7:
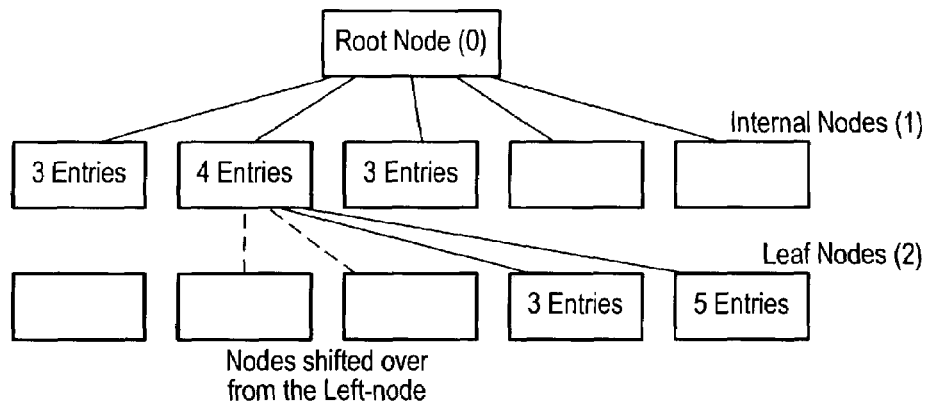

During Iteration 4, a delete-merge will be performed on level-2, a delete and shift (with the left-node) will be performed on level-1 and a shift adjust will be performed on level-0. The starting key for the next iteration will be shifted beyond Y and the delete operation will exit in the first phase of the next iteration since there will be no more keys to delete within the starting range X-Y. The final state of the tree after the range deletion operation will be as shown in FIG. 7.

The delete method described herein provides the ability to delete all the keys in the leaf-node that lie within the specified range (even delete the whole leaf-node if all the keys in the leaf-node are within the specified range) in a single iteration, and rebalance the upper-nodes as required. If the delete range spans multiple nodes, most of the nodes in the span are completely deleted, one per iteration, making it increasingly efficient as the span of the B+ tree increases. Assuming an average occupancy of 75% for a B+ tree with a span of 100, the delete process can on average delete almost 75 entries per iteration. This is a significant gain over having to perform a delete for every key in the range. A second advantage is that all the keys in the range need not be known before-hand, just the starting and ending keys describing the range are required. The starting and ending keys also need not to be valid entries in the tree.

One embodiment of the invention comprises the delete process described herein modified to support range deletions in the internal-nodes also. As noted above, other embodiments of the invention comprise a variation of the delete process described herein used for other types of tree data structures. Various other embodiments of the method are also contemplated.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

The invention claimed is:

1. A computer-readable memory medium comprising program instructions for deleting a range of keys in a B+ tree, wherein the program instructions are executable to implement:

storing the B+ tree on a memory medium of a computer system;

receiving information regarding the range of keys to be deleted in the B+ tree; and deleting the range of keys from the B+ tree from the memory medium;

wherein after said deleting, the B+ tree utilizes less memory space on the memory medium;

wherein said deleting comprises:

walking at least a portion of the B+ tree, wherein said walking comprises identifying nodes in the range of keys to be deleted and storing information in a delete data structure regarding the identified nodes in the range of keys to be deleted;

determining operations to be performed at one or more levels in the B+ tree based on the identified nodes, wherein the operations comprise one or more delete operations, wherein determining the operations comprises utilizing the information regarding the identified nodes from the delete data structure and storing the determined operations in the delete data structure;

performing the operations to delete one or more keys in the range of keys, wherein said performing the operations comprises traversing the delete data structure to perform the operations stored in the delete data structure; and repeating said walking, said determining, and said performing one or more times to delete the range of keys.

2. The computer-readable memory medium of claim 1, wherein said deleting is performed in a plurality of iterations, wherein, for each of at least a subset of the plurality of iterations, said deleting comprises:

deleting all of the keys in one or more leaf-nodes that lie within the range of keys; and adjusting one or more nodes as required after said deleting.

3. The computer-readable memory medium of claim 2, wherein said adjusting comprises adjusting entries from one or more nodes and neighboring nodes at two or more levels to rebalance the B+ tree after the deleting.

4. The computer-readable memory medium of claim 2, wherein said adjusting comprises performing one or more of deleting, shifting and/or rotating entries from one or more nodes and neighboring nodes at two or more levels to rebalance the B+ tree after the deleting.

5. The computer-readable memory medium of claim 1, wherein said deleting comprises deleting the range of keys in a plurality of iterations;
wherein the plurality of iterations is substantially less than the total number of keys in the range of keys.

6. The computer-readable memory medium of claim 1, wherein the information regarding the range of keys to be deleted comprises a starting key and an ending key.

7. The computer-readable memory medium of claim 6, wherein at least one of the starting key and the ending key is an entry in the B+ tree.

8. The computer-readable memory medium of claim 1, wherein the range of keys spans multiple nodes.

9. The computer-readable memory medium of claim 1, wherein the B+ tree comprises a root node and a plurality of leaf nodes;
wherein said walking comprises walking the at least a portion of the B+ tree starting from the root node;
wherein said determining operations comprises walking the delete data structure starting from a leaf node;
wherein said performing the operations comprises walking the delete data structure starting from a leaf node.

10. The computer-readable memory medium of claim 1, wherein the information regarding the range of keys to be deleted comprises a starting key and an ending key;
wherein said walking comprises using the starting key as a search key in said walking.

11. The computer-readable memory medium of claim 1, wherein said walking comprises, at each level, locking a search node, a left node of the search node, if present, and a right node of the search node, if present.

12. The computer-readable memory medium of claim 1, wherein the operations further comprise one or more node adjustment operations.

13. The computer-readable memory medium of claim 1, wherein said determining operations comprises determining at least one operation to be performed on each level that is affected by the deletion.

14. The computer-readable memory medium of claim 1, wherein said operations comprise two or more of:
a simple delete;
a node delete;
a shift and delete;
an adjust parent-node after a shift and delete at the lower level;
a merge and delete;
an adjust parent-node after a merge and delete at the lower level; and
a root collapse.

15. A method for deleting a range of keys in a B+ tree, the method comprising:
storing the B+ tree on a memory medium of a computer system;
receiving information regarding the range of keys to be deleted in the B+ tree; and
deleting the range of keys from the B+ tree from the memory medium;
wherein after said deleting, the B+ tree utilizes less memory space on the memory medium;
wherein said deleting comprises:
walking at least a portion of the B+ tree, wherein said walking comprises identifying nodes in the range of keys to be deleted and storing information in a delete data structure regarding the identified nodes in the range of keys to be deleted;
determining operations to be performed at one or more levels in the B+ tree based on the identified nodes, wherein the operations comprise one or more delete operations, wherein determining the operations comprises utilizing the information regarding the identified nodes from the delete data structure and storing the determined operations in the delete data structure;
performing the operations to delete one or more keys in the range of keys, wherein said performing the operations comprises traversing the delete data structure to perform the operations stored in the delete data structure; and
repeating said walking said determining and said performing one or more times to delete the range of keys.

16. The method of claim 15, wherein said deleting is performed in a plurality of iterations, wherein, for each of at least a subset of the plurality of iterations, said deleting comprises:
deleting all of the keys in one or more leaf-nodes that lie within the range of keys; and
adjusting one or more nodes as required after said deleting.

17. The method of claim 16, wherein said adjusting comprises adjusting entries from one or more nodes and neighboring nodes at two or more levels to rebalance the B+ tree after the deleting.

18. The method of claim 15, wherein said deleting comprises deleting the range of keys in a plurality of iterations;
wherein the plurality of iterations is substantially less than the total number of keys in the range of keys.

19. A system for deleting a range of keys in a B+ tree, the system comprising:
a memory medium which stores:
the B+ tree;
delete program instructions executable to delete the range of keys in the B+ tree;
an input device for receiving information regarding the range of keys to be deleted in the B+ tree; and
a processor coupled to the memory medium and the input device, wherein the processor is operable to execute the delete program instructions to delete the range of keys from the B+ tree from the memory medium;
wherein after said deleting, the B+ tree utilizes less memory space on the memory medium;
wherein said deleting comprises:
walking at least a portion of the B+ tree, wherein said walking comprises identifying nodes in the range of keys to be deleted and storing information in a delete data structure regarding the identified nodes in the range of keys to be deleted;
determining operations to be performed at one or more levels in the B+ tree based on the identified nodes, wherein the operations comprise one or more delete operations, wherein determining the operations comprises utilizing the information regarding the identified nodes from the delete data structure and storing the determined operations in the delete data structure;

performing the operations to delete one or more keys in the range of keys, wherein said performing the operations comprises traversing the delete data structure to perform the operations stored in the delete data structure; and repeating said walking, said determining and said performing one or more times to delete the range of keys.

20. The system of claim 19, wherein said deleting the range of keys is performed in a plurality of iterations, wherein, for each of at least a subset of the plurality of iterations, the processor is operable to execute the delete program instructions to:

delete all of the keys in one or more leaf-nodes that lie within the range of keys; and adjust one or more nodes as required after said deleting.

21. A computer-readable memory medium comprising program instructions for deleting a range of keys in a B-tree, wherein the program instructions are executable to implement:

storing the B-tree on a memory medium of a computer system;

receiving information regarding the range of keys to be deleted in the B-tree; and deleting the range of keys from the B-tree from the memory medium;

wherein after said deleting, the B-tree utilizes less memory space on the memory medium;

wherein said deleting comprises:

walking at least a portion of the B-tree, wherein said walking comprises identifying nodes in the range of keys to be deleted and storing information in a delete data structure regarding the identified nodes in the range of keys to be deleted;

determining operations to be performed at one or more levels in the B-tree based on the identified nodes, wherein the operations comprise one or more delete operations, wherein determining the operations comprises utilizing the information regarding the identified nodes from the delete data structure and storing the determined operations in the delete data structure;

performing the operations to delete one or more keys in the range of keys, wherein said performing the operations comprises traversing the delete data structure to perform the operations stored in the delete data structure; and repeating said walking, said determining, and said performing one or more times to delete the range of keys.

22. The computer-readable memory medium of claim 21, wherein said deleting is performed in a plurality of iterations, wherein, for each of at least a subset of the plurality of iterations, said deleting comprises:

deleting all of the keys in one or more nodes that lie within the range of keys; and adjusting one or more nodes as required after said deleting.

23. The computer-readable memory medium of claim 22, wherein said adjusting comprises adjusting entries from one or more nodes and neighboring nodes at two or more levels to rebalance the B-tree after the deleting.

\* \* \* \* \*